United States Patent
Moser et al.

(10) Patent No.: US 8,732,950 B2
(45) Date of Patent: May 27, 2014

(54) METHOD FOR A PRODUCTION OF A HEAT EXCHANGER FOR AN INLINE MEASURING DEVICE

(75) Inventors: Thiérry Moser, Sierentz (FR); Roland Unterseh, St. Louis (FR); Michael Fuchs, Eschbach (DE); Patrick Oudoire, Soultz (FR)

(73) Assignee: Endress + Hauser Flowtec AG, Reinach (CH)

( * ) Notice: Subject to any disclaimer, the term of this patent is extended or adjusted under 35 U.S.C. 154(b) by 1022 days.

(21) Appl. No.: 11/543,920

(22) Filed: Oct. 6, 2006

(65) Prior Publication Data

US 2007/0062035 A1    Mar. 22, 2007

Related U.S. Application Data

(62) Division of application No. 11/106,444, filed on Apr. 15, 2005, now Pat. No. 7,162,931.

(30) Foreign Application Priority Data

Apr. 16, 2004  (DE) .......................... 10 2004 019 255
Apr. 19, 2004  (DE) .......................... 10 2004 019 390

(51) Int. Cl.
*B21D 53/02*    (2006.01)
(52) U.S. Cl.
USPC .............. 29/890.038; 29/890.03; 29/890.039; 29/890.04; 73/861.357
(58) Field of Classification Search
USPC ........... 29/890.03, 890.038, 890.039, 890.04; 73/23.2, 861.357, 861.355, 861.356
See application file for complete search history.

(56) References Cited

U.S. PATENT DOCUMENTS

| | | | |
|---|---|---|---|
| 3,335,789 A | | 8/1967 | Raskin |
| 4,498,220 A | * | 2/1985 | Fiegen et al. ............ 29/890.038 |
| 4,584,868 A | * | 4/1986 | Jacobsen et al. ............... 73/23.2 |
| 5,979,246 A | * | 11/1999 | Van Cleve et al. ....... 73/861.357 |
| 6,029,348 A | * | 2/2000 | Makino et al. ............. 29/890.03 |

(Continued)

FOREIGN PATENT DOCUMENTS

| | | |
|---|---|---|
| CA | 2 367 726 A1 | 7/2003 |
| FR | 2 237 156 | 2/1975 |

(Continued)

OTHER PUBLICATIONS

IPER.

*Primary Examiner* — Rick K Chang
(74) *Attorney, Agent, or Firm* — Bacon & Thomas, PLLC

(57) ABSTRACT

A method for a production of a heat exchanger for an inline measuring device includes the steps of: producing first opening provided for the connection of the heat exchanger to a temperature control piping system in a first sheet part serving for the production of one of the heat exchanger sheets; laying the first sheet part on a second sheet part serving likewise for the production of one of the heat exchanger sheets; producing an edge connection seam and inner connection locations by welding of the two superimposed sheet parts; introducing fluid through a first opening into a chamber remaining between the two sheets; superimposing a static pressure on the fluid in the chamber which exceeds a static pressure of a surrounding atmosphere to such a degree that an expansion of the chamber is initiated; and plastically deforming material of the thinner of the two sheet parts by expanding the chamber by means of the fluid with superimposed pressure.

14 Claims, 13 Drawing Sheets

(56) References Cited

U.S. PATENT DOCUMENTS

| | | |
|---|---|---|
| 6,352,000 B1 | 3/2002 | Getman |
| 6,487,917 B1 * | 12/2002 | Van Cleve et al. ....... 73/861.357 |
| 6,598,489 B1 * | 7/2003 | Van Cleve et al. ....... 73/861.357 |
| 7,013,565 B1 * | 3/2006 | Zelinski ..................... 29/890.08 |
| 7,438,123 B2 * | 10/2008 | Tadokoro ..................... 165/164 |
| 2002/0174730 A1 * | 11/2002 | Drahm et al. ............ 73/861.355 |

FOREIGN PATENT DOCUMENTS

| | | |
|---|---|---|
| JP | 07120181 | 5/1993 |
| JP | 2000 205783 | 7/2000 |
| WO | WO 99/58920 | 11/1999 |

* cited by examiner

METHOD FOR A PRODUCTION OF A HEAT EXCHANGER FOR AN INLINE MEASURING DEVICE This application is a divisional of U.S. application Ser. No. 11/106,444 filed on Apr. 15, 2005 now U.S. Pat. No. 7,162,931.

FIELD OF THE INVENTION

The invention relates to an apparatus for controlling temperature in an inline measuring device having at least one measuring tube inserted into the course of a process line and serving for conveying a process fluid to be measured. Additionally, the invention relates to a heat exchanger suited for the apparatus and a method for the manufacture of the heat exchanger.

BACKGROUND OF THE INVENTION

In the technology of industrial process measurements, especially also in connection with the automation of chemical processes or processing operations, process measuring devices and also field measuring devices are installed on site, thus near to the process, for producing measured value signals representing physical, measured variables.

For the measurement of physical, measured variables, such as e.g. a mass and/or volume flow rate, a density, a viscosity, etc., of media conveyed in pipelines, process measuring devices are often used, which effect the required physical-to-electric conversion of the measured variable by means of a physical-electric measurement pickup and a measuring apparatus electronics connected thereto. The measurement pickup is inserted into the course of a pipeline conveying the medium and thus the medium flows through the pickup during operation. For registering these measured variables, such process measuring devices (referred to herein as inline measuring devices) mostly have a measurement pickup involving at least one measuring tube installed directly into the course of the pipeline. Examples of such inline measuring devices, sufficiently known to those skilled in the art, are described in detail in the U.S. Pat. Nos. 6,691,583, 6,450,042, 6,354,154, 6,352,000, 6,308,580, 6,006,609, 6,003,384, 5,979,246, 5,850,039, 5,796,011, 5,602,345, 5,301,557, 4,768,384, as well as in WO-A 03 095 950, WO-A 03 095 949, or WO-A 95 16 897. Examples of measured variables include a mass flow rate, a density, a viscosity, a pressure or a temperature, or the like, of a liquid, powdered, vaporous or gaseous, process medium.

For a most-often centralized evaluation of the registered, measured variables, process measuring devices of the described kind are, moreover, usually connected together and/or to appropriate process control computers via a data transmission system connected to the measuring apparatus electronics. The measured value signals are sent to other process measuring devices and/or to the process control computers e.g. via (4 to 20 mA-) current loops and/or via digital data busses. Capable of serving as the data transmission system are, in such case, especially serial, fieldbus systems, such as e.g. PROFIBUS-PA, FOUNDATION FIELDBUS, as well as the corresponding transmission protocols. The transmitted, measured value signals can be processed further in the process control computers and visualized as corresponding measurement results e.g. on monitors and/or transformed into control signals for process actuators, such as e.g. solenoid valves, electromotors, etc. For accommodating measuring apparatus electronics, such process measuring devices further include an electronics housing, which, as proposed e.g. in U.S. Pat. No. 6,397,683 or WO-A 00 36 379, can be arranged remote from the process measuring apparatus or connected therewith over a flexible cable or which is, as e.g. shown in EP-A 903 651 or EP-A 1 008 836, arranged directly on the measurement pickup or on a measurement pickup housing separately accommodating the measurement pickup. The electronics housing often then serves also, as shown, for example, in EP-A 984 248, U.S. Pat. No. 4,594,584, U.S. Pat. No. 4,716,770 or U.S. Pat. No. 6,352,000, for additionally accommodating some mechanical components of the measurement pickup, such as e.g. membrane-, diaphragm-, rod-, shell- or tube-shaped deformation, or vibration, members, which mechanically deform during operation; compare, in this connection, the above-mentioned U.S. Pat. No. 6,352,000.

Due to their broad spectrum of application, inline measuring devices with vibration-type measurement pickups have become established for the measurement of media flowing in pipelines. These vibratory pickups utilize at least one measuring tube, which vibrates during operation. The vibrating pickups bring about mechanical reaction forces in the medium flowing therethrough, for example Coriolis forces corresponding to the mass flow rate, inertial forces corresponding to the density of the medium and/or frictional forces corresponding to viscosity. Such inline measuring devices, as well as their manner of operation, are familiar to those skilled in the art and are described in detail e.g. in the already mentioned U.S. Pat. Nos. 6,691,583, 6,450,042, 6,354,154, 6,308,580, 6,006,609, 5,979,246, 5,850,039, 5,796,011, 5,602,345, 5,301,557, 4,876,898, 4,768,384, as well as in WO-A 03 095 950, WO-A 03 095 949, WO-A 02 088 641 or WO-A 95 16 897.

For the conveying of the medium, such vibration-type measurement pickups include, in each case, at least one measuring tube held in a, for example tubular or box-shaped, support frame. The measuring tubes have a curved, or straight, tube segment, which is caused to vibrate in a suitable oscillation mode—driven by an electromechanical exciter arrangement—for producing the aforementioned reaction forces during operation. For registering vibrations of the tube segment, the measurement pickups additionally include a sensor arrangement, which reacts to movements of the vibrating tube segment. The sensor arrangement has physical-electrical, mostly electrodynamic or opto-electronic, oscillation sensors, which deliver oscillation measurement signals representing local oscillations of the measuring tube.

The at least one measuring tube, as well as the exciter and sensor arrangements, are surrounded by a housing cap, which is connected to the support frame, especially welded thereto or integrated therewith. The thus-formed measurement pickup housing serves, besides for holding the at least one measuring tube, among other things also for protecting the measuring tube, and the exciter and sensor arrangements, as well as other internally situated components, from external, environmental influences, such as dust or water spray, and also for suppressing sound emissions of the measurement pickup.

For the case that the inline measuring device is installed as a Coriolis mass flow meter, the measuring apparatus electronics repeatedly determines, among other things, a phase difference between the oscillation measurement signals, which are delivered from two mutually spaced, oscillation sensors, and the measuring apparatus electronics issues at its output a measured value signal, which, in correspondence with the time behavior of the determined phase difference, represents a measured value of the mass flow rate. In addition to this, such inline measuring devices can, as described in the above-referenced WO-A 95/16897, U.S. Pat. No. 4,524,610 or U.S. Pat. No. 4,187,721, measure the instantaneous density of the flowing medium, on the basis of a frequency of at least one of the oscillation measurement signals delivered by the sensor arrangement. Additionally, such inline measuring devices can also directly measure a viscosity and/or a viscosity-density product of the medium located in the vibrating measuring tube; compare, in this connection, especially the U.S. Pat. Nos. 6,651,513, 5,531,126, 5,253,533, 4,524,610 or WO-A 95/16897. Besides this, alone for the purpose of possibly required compensations of temperature effects in the oscillation measurement, most often also a temperature of the medium and/or of individual components of the measurement pickup are directly measured in suitable manner, for example by means of temperature sensors arranged on the measuring tube and/or on the housing.

In the case of using inline measuring devices in applications where the medium to be measured, for example heated hydrocarbon compounds or the like, are to be kept as accurately as possible within a predetermined temperature range, it is often necessary also to control the temperature of the inline measuring device in suitable fashion, for example by the introduction, or withdrawal, of heat. For controlling the temperature of inline measuring devices, thus for the adding, or withdrawal, of heat, especially devices have proven successful, which tie into an appropriate temperature-control piping system installed on site and carrying a suitable temperature-control fluid, such as e.g. water, water vapor, oil, or the like. Such devices for controlling the temperature of inline measuring devices have been available on the market for quite some time.

An apparatus available from the assignee itself—to be considered as fairly representative of temperature control apparatuses common at this time—exhibits, for example, as shown schematically in FIGS. 1 and 2, two heat exchangers, each having a chamber which can be connected to the temperature control piping system. These chambers are mountable opposite to one another externally, by means of suitable securement means, onto the inline measuring device. In this case, due to the principle of measurement, the mounting is directly on the measurement pickup housing. Each of the two heat exchangers has an inner wall contacting the inline measuring device externally flushly, at least in part, and appropriately corresponding to the external contour of the inline measuring device. Welded onto the inner wall is an essentially box-shaped outer wall for forming a chamber therebetween. For the purpose of controlling the temperature of the inline measuring device, the two chambers have temperature-control fluid flowing through them during operation.

A disadvantage of temperature-control devices constructed in this way is, on the one hand, the rather unfavorably designed volume of the chamber containing the temperature-controlling fluid. Size and shape of the illustrated chamber lead, namely, to the fact that the temperature-controlling apparatus exhibits a very great thermal inertia with respect to the ability of temperature changes within the chamber to act on the inner wall, thus a very low response dynamics. Beyond this, considerable dead volume forms within the chamber, where the temperature-controlling fluid scarcely circulates, if at all. Also, there is no studied guidance of the flow of the temperature-controlling fluid. As a result of these factors, such devices mostly have a very low thermal efficiency at relatively low heating/cooling power, as, in fact, confirmed by the experimentally determined temperature plots shown in FIG. 3. Moreover, such devices usually also have a very high weight, which can lie about in the area of 100% of the nominal weight of the inline measuring device whose temperature is to be controlled, thus, at around 100 kg, or even more. Additionally, the rather unfavorably shaped, outer wall requires, with its relatively large surface area, considerable attention to the blocking of heat flow as regards thermal insulation.

A further disadvantage of such temperature control devices lies in the fact that they exhibit a rather low nominal pressure resistance, which, as shown, for example, in FIG. 4 for the above-described apparatus in the case of inline measuring devices of nominal diameter DN≤100 mm, can, moreover, sink considerably with increasing temperature. Beyond this, the large volumes of the chambers, which mostly significantly exceed 20 l, lead to the fact that the applied heat exchangers are subjected to increased demands with respect to their pressure resistance and strength testing. As a result, the use of such devices is often allowable only for applications of relatively low temperatures, for example of below 200° C., and/or of low pressure within the temperature-controlling system, for example pressures below 3 bar.

Each individual temperature-controlling apparatus of the described kind is, consequently, quite complicated, so that it is feasible only for manufacture in small runs, or ever single units.

SUMMARY OF THE INVENTION

An object of the invention is, therefore, to provide an apparatus serving for the temperature-control of inline measuring devices, as well as a heat exchanger suitable for such an apparatus, which exhibits a high thermal efficiency at relatively high pressure resistance and temperature resistance. Beyond this, the apparatus should be simple to manufacture and thus also suitable for production in significant numbers.

To achieve this object, the invention resides in a apparatus for the temperature-control of an inline measuring device having at least one measuring tube inserted into the course of a process line and serving to convey a process fluid to be measured, which apparatus includes:

- at least one, first heat exchanger secured on the inline measuring device and conveying, at least at times during operation, a temperature-control fluid serving for the transport of heat; as well as
- securement means for the attachment, especially the releasable attachment, of the at least one, first heat exchanger externally on the inline measuring device;
- wherein the heat exchanger has an inner wall, especially an inner wall having a trough- or dish-shape, at least partially flushly contacting the exterior of the inline measuring device, together with an outer wall attached to the inner wall;
- wherein the outer wall is connected with the inner wall via an edge connection seam running along an edge region and sealing against leakage of the temperature-control fluid, and via a plurality of internal connection locations, especially point- or ring-shaped connection locations, which are arranged spaced from one another in an inner region at least partially surrounded by the edge connection seam, such that, between the inner wall and the outer wall, at least one chamber is formed exhibiting a plurality of sections communicating with one another and serving to convey the temperature-controlling fluid; and
- wherein the chamber is incorporated, via openings opening into such chamber, into a temperature-control piping system conveying the temperature-control fluid.

Beyond this, the invention resides in a heat exchanger for an inline measuring device having at least one measuring tube, which is insertable into the course of a process line serving to convey a process fluid to be measured, especially in a heat exchanger suited for use in the above-defined apparatus, which heat exchanger includes at least two heat exchanger sheets,

- of which one, inner, first heat exchanger sheet, especially a sheet in the shape of a trough or dish, is suited for contacting the inline measuring device externally during operation at least sectionally flushly in a predeterminable contact area and, thus, to form an inner wall of the heat exchanger, and
- of which an outer, second heat exchanging sheet attached to the first heat exchanger sheet forms an outer wall of the heat exchanger,
- wherein the two heat exchanger sheets are connected together via a edge connection seam running along an edge region, and via a plurality of internal connection locations, especially point- or ring-shaped connection locations, which are arranged spaced from one another in an inner region at least partially surrounded by the edge connection seam, such that, enclosed by the two heat exchanger sheets, at least one chamber is formed exhibiting a plurality of sections communicating with one another; and
- wherein the chamber is incorporatable, via openings arranged in at least one of the heat exchanger sheets and opening into such chamber, into a temperature-control piping system conveying a temperature-control fluid serving for the transport of heat.

Further, the invention resides in a method for the production of such a heat exchanger, which method includes the following steps:

- Producing at least one, first opening of openings provided for the connecting of the heat exchanger to the temperature control piping system, in a first sheet part serving for the production of one of the heat exchanger sheets;
- laying the first sheet part on a second sheet part serving likewise for the production of one of the heat exchanger sheets, especially a second sheet part having a sheet thickness different from a sheet thickness of the first sheet part;
- producing the edge connection seam and the inner connection locations by welding, especially laser welding, of the two superimposed sheet parts;
- introducing, through the first opening, fluid, especially largely incompressible fluid, especially water, oil, or the like, into a chamber remaining between the two sheet parts connected with one another;
- superimposing on the fluid filled in the chamber a static pressure, which exceeds a static pressure of a surrounding atmosphere to such a degree, especially a pressure exceeding 100 bar, such that an expansion of the chamber is initiated, and
- plastically deforming material principally of the thinner of the two sheet parts, by expanding the chamber by means of the fluid with the superimposed pressure.

In a first embodiment of the apparatus of the invention, the first heat exchanger is essentially attached to the inline measuring device by a force fit.

In a second embodiment of the invention, the apparatus further includes a second heat exchanger, especially a second heat exchanger having essentially the same structure as the first heat exchanger, with the securement means also serving for the attachment, especially, again, the releasable attachment, of the second heat exchanger externally on the inline measuring apparatus.

In a third embodiment of the apparatus of the invention, the securement means serve for the force-fit attachment of both heat exchangers.

In a fourth embodiment of the apparatus of the invention, the securement means are at least partially constructed as integral components of the first and/or the second heat exchanger.

In a fifth embodiment of the apparatus of the invention, the two heat exchangers are connected with one another mechanically by means of the securement means.

In a sixth embodiment of the apparatus of the invention, the two heat exchangers are arranged opposite to one another on the inline measuring device.

In a seventh embodiment of the apparatus of the invention, the edge connection seam closes on itself.

In a first embodiment of the heat exchanger of the invention, the outer, second heat exchanger sheet has a plurality of regions, especially a plurality of regions corresponding with the number of the internal connection seams, where the material of the second heat exchanger sheet is plastically deformed such that it is curved permanently outwards to form the chamber located between the two heat exchanger sheets.

In a second embodiment of the heat exchanger of the invention, there is at least one inlet nozzle fixed on at least one of the two heat exchanger sheets, opening via a first opening into the chamber and serving to enable the connection of the heat exchanger, especially releasably, with a first fluid line supplying the temperature-control fluid.

In a third embodiment of the heat exchanger of the invention, the inlet nozzle is fixed on the outer, second heat exchanger sheet.

In a fourth embodiment of the heat exchanger of the invention, an outlet nozzle is fixed on at least one of the two heat exchanger sheets, opening into the chamber via a second opening and serving to enable the connection of the heat exchanger, especially releasably, with a second fluid line discharging the temperature-control fluid.

In a fifth embodiment of the invention, the outlet nozzle is fixed on the outer, second heat exchanger sheet.

In a sixth embodiment of the heat exchanger of the invention, at least the inner connection seams, especially also the edge connection seam, are laser weld seams.

In a seventh embodiment of the heat exchanger of the invention, at least one of the two heat exchanger sheets is made of stainless steel, especially high-grade steel.

In an eighth embodiment of the heat exchanger of the invention, the inner, first heat exchanger sheet has a sheet thickness, which differs from a sheet thickness of the outer, second heat exchanger sheet.

In a ninth embodiment of the heat exchanger of the invention, the sheet thickness of the first heat exchanger sheet is greater than the sheet thickness of the second heat exchanger sheet.

In a first embodiment of the method of the invention, such further includes the step of deforming, especially bending, the sheet part in such a manner that the sheet part serving as the inner, first heat exchanger sheet has, at least sectionally, a spatial shape corresponding to the contact region provided on the inline measuring device.

In a second embodiment of the method of the invention, such further includes the steps of:

- Fixing the inlet nozzle or the outlet nozzle on the first sheet part, such that it opens into the first opening; and
- connecting a pressure line for the fluid onto the inlet, or the outlet, nozzle fixed on the sheet part.

In a third embodiment of the method of the invention, such further includes the steps of:

Producing in one of the two sheet parts at least one, second opening provided for the connection of the heat exchanger to the temperature-control piping-system; and pressure-tight sealing of one of the two openings following the step of introducing fluid into the chamber.

In a fourth embodiment of the method of the invention, such further includes the steps of:

Fixing the inlet nozzle or the outlet nozzle on the first sheet part, such that it communicates through the first opening with the chamber; and pressure-tight sealing of the inlet nozzle, or the outlet nozzle fixed on the sheet part.

In a fifth embodiment of the method of the invention, the step of fixing the inlet nozzle or the outlet nozzle on the first sheet part includes a step of bending up and/or crimping an edge of the first opening.

In a sixth embodiment of the method of the invention, the step of fixing the inlet nozzle or the outlet nozzle on the first sheet part includes a step of at least pointwise fixing of the edge of the first opening on an oppositely lying section of the second sheet part.

The apparatus of the invention is distinguished by the very small volume of the chamber, coupled with a relatively-large contact area, and especially by a very high thermal efficiency at high heating/cooling power. As a result of this, the apparatus has a relatively low weight, which can amount to about in the range of 10% of the weight of the above-described apparatus of the state of the art, in any case clearly below 30 kg. The heat releasing surface of the outer wall can likewise be kept very small. Beyond this, the apparatus of the invention exhibits a very high pressure resistance, even for temperatures far above 300° C. Additionally, there is almost no dead space within the chamber, space where circulation of the temperature-controlling fluid would be blocked. Additionally, an optimizing of the flow of the temperature-control fluid can be accomplished in very simple manner by suitable arrangement of the internal connection locations.

BRIEF DESCRIPTION OF THE DRAWINGS

The invention will now be explained in greater detail on the basis of examples of embodiments and the figures of the drawing, in which a preferred example of an embodiment is illustrated. Functionally equivalent parts are provided in the individual figures with the same reference characters; however, reference characters are only repeated in subsequent figures when such appears useful.

DESCRIPTION OF THE PREFERRED EMBODIMENT

Figure 5:
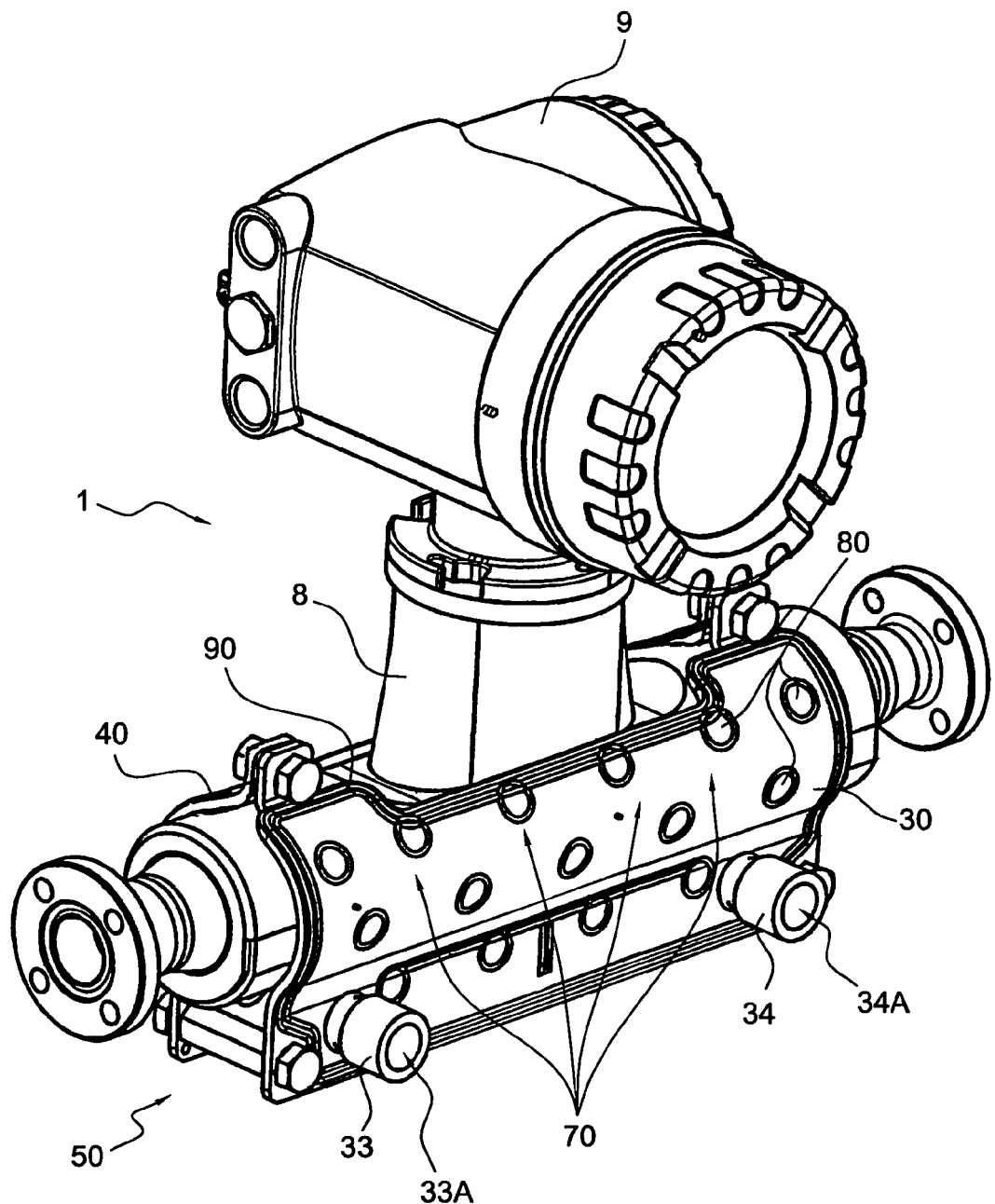
FIGS. 5, 6 show schematically an example of an embodiment of a apparatus for temperature control of an inline measuring device by means of heat exchangers.
Figure 6:
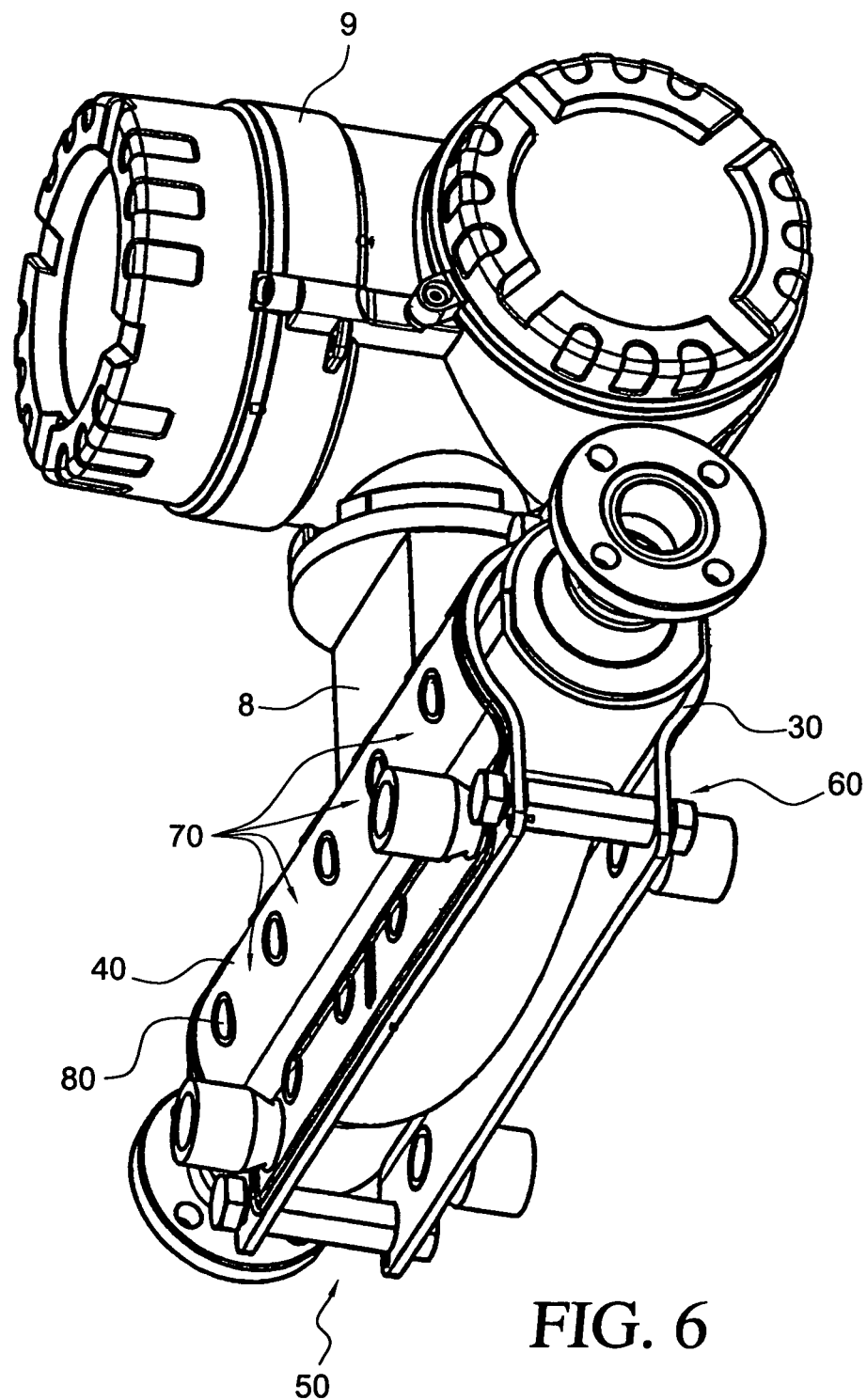

FIGS. 5 and 6 show an apparatus for controlling the temperature of a process measuring device in the form of an inline measuring device. The process measuring device 1 serves for registering at least one measured variable, especially a physical, measured value, e.g. a mass flow rate, a density and/or a viscosity of a medium conveyed in a pipeline (not shown) and to image such in a measured value signal instantaneously representing this measured variable. An example of an inline measuring device registers the measured variable by means of a vibration-type measurement pickup 10 accommodated preferably within a measurement-pickup housing 7, 6, and by means of measuring apparatus electronics accommodated preferably in an electronics housing 9 and electrically connected with the measurement pickup 10. The apparatus serves for maintaining a temperature of the inline measuring device and, consequently, also a temperature of the medium conveyed through the inline measuring device, within a predetermined temperature range.

For the conveying of the medium, such a measurement pickup includes at least one measuring tube communicating with the pipeline. The measuring tube is held oscillatably in a support frame. During operation, the measuring tube is, as usual in the case of such measurement pickups, caused to vibrate in a suitable oscillation mode such that reaction forces of sufficient size are produced in the fluid flowing therethrough. These forces correspond to the measured variable and include e.g. Coriolis forces, acceleration forces and/or frictional forces. These forces, in turn, act on the vibrating measuring tube, for instance on a form of oscillation and/or on an oscillation frequency of the measuring tube, in a measurable (thus, registerable by sensor and electronically evaluatable) manner. For driving the measuring tube, the measurement pickup 1 includes at least one, especially electrodynamic, oscillation exciter 113. This serves to transform an electric power $P_{exc}$ fed from the measuring device electronics 20 into such, e.g. pulsating or harmonic, exciter forces $F_{exc}$, which act on the at least one measuring tube and, in this way, produce the suitable oscillations of the measuring tube. The exciter forces $F_{exc}$ can, in manner known to those skilled in the art, be adjusted with respect to their amplitude, e.g. by means of a current, and/or voltage, control circuit, and with respect to their frequency, e.g. by means of a phase control loop; compare, in this regard, U.S. Pat. No. 4,801,897. Serving as measurement signal in the case of measurement pickups of vibration-type are oscillation measurement signals S114 and/or S115 produced by means of a sensor arrangement and suitably representing the oscillations of the at least one measuring tube. Especially the determination of the mass flow rate, the density and/or the viscosity using one or more of such oscillation measurement signals representing oscillations of the vibrating measuring tube is known, per se, to those skilled in the art and, therefore, requires no further explanations here. In terms of examples, reference is made to EP-A 1 291 639, U.S. Pat. No. 6,651,513, U.S. Pat. No. 6,513,393, U.S. Pat. No. 6,006,609, U.S. Pat. No. 5,687,100, U.S. Pat. No. 5,648,616, U.S. Pat. No. 5,597,949, U.S. Pat. No. 5,359,881, U.S. Pat. No. 5,317,928, U.S. Pat. No. 5,295,084, U.S. Pat. No. 4,996,871, U.S. Pat. No. 4,984,472, U.S. Pat. No. 4,876,879, U.S. Pat. No. 4,524,610 or WO-A 9516897.

An example of an embodiment for an inline measuring device with a measurement pickup of vibration-type, especially a vibration-type measurement pickup serving as a Coriolis mass flow rate, density and/or viscosity pickup, is shown in FIGS. 7-10 and will be explained together in the following. Further examples of suitable forms of embodiment of vibration-type measurement pickups are disclosed in, among others, also the initially referenced U.S. Pat. Nos. 6,691,583, 6,450,042, 6,354,154, 6,308,580, 6,006,609, 5,979,246, 5,850,039, 5,796,011, 5,602,345, 5,301,557, 4,768,384, as well as in WO-A 03 095 950, WO-A 03 095 949, or WO-A 95 16 897.

Figure 9:
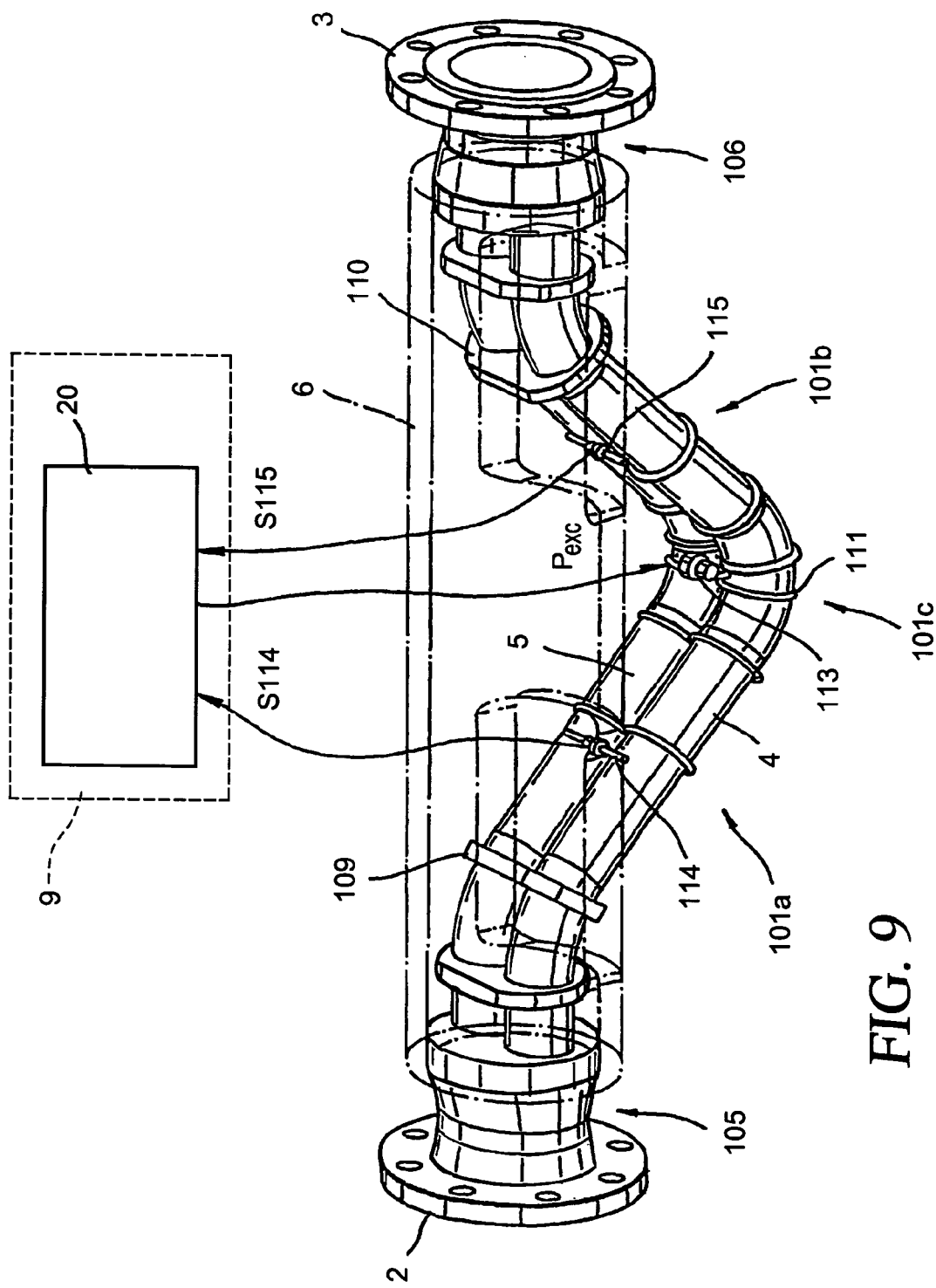
Figure 10:
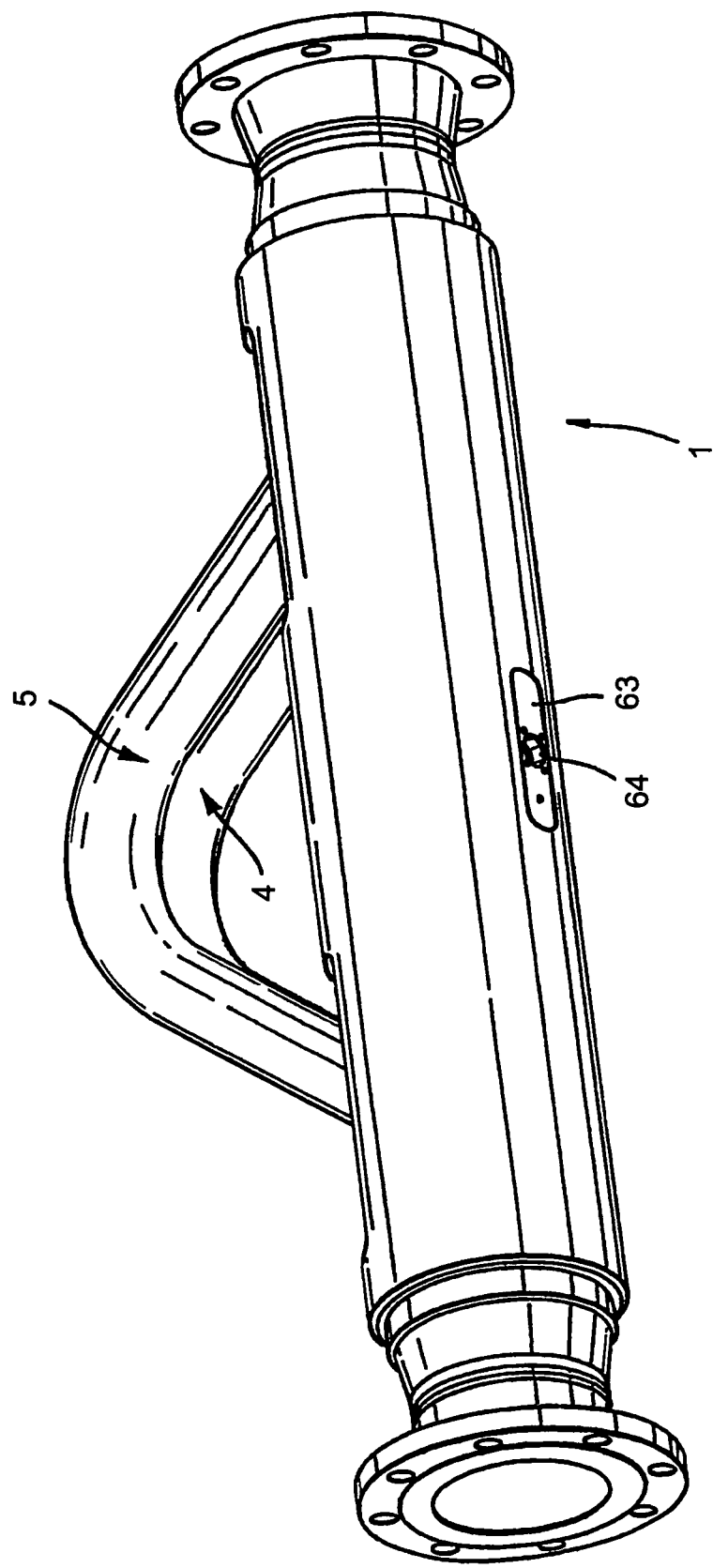

In the example of an embodiment shown here, the measurement pickup 1 includes a curved, first measuring tube 4, which, as evident, without more, from FIGS. 9 and 10, is formed such that it has, at the inlet end, a first, straight tube segment 101a and, at the outlet end, a second, straight tube segment 101b. The two straight tube segments 101a, 101b are connected together via an arc-shaped, e.g. circular arc-shaped, tube segment 101c of predeterminable spatial shape, and are, in fact, so oriented with respect to one another that the measuring tube 4 spans a planar surface. Instead of the essentially V-shaped measuring tube 4 shown here, practically all other measuring tubes suited for such inline measuring devices can be used. Other suitable spatial forms for the measuring tube 4 can also be taken e.g. from the initially cited U.S. Pat. No. 5,731,527, U.S. Pat. No. 5,301,557, U.S. Pat. No. 4,895,030, WO-A 01/33 174 or WO-A 00/57 141. The material of measuring tube 4 can be practically any conventionally used for such measuring tubes such as high-grade, low sulfur, low phosphorus steel, particularly high-grade stainless steel, alloys of titanium, tantalum or zirconium, etc.

As shown in FIG. 9, the measuring tube 4 opens with an inlet end into an inlet tube piece 103 and with an outlet end into an outlet tube piece 104. Inlet tube piece 103 is connected, in the case of installed measuring apparatus, with an inlet-end section of the pipeline (which is usually straight) conveying the fluid, while outlet tube piece 104 is then connected with an outlet-end section of the pipeline. The two tube pieces 103, 104 are, consequently, preferably aligned with one another and with a longitudinal axis A1 of the measurement pickup imaginarily connecting the two pieces. Advantageously, the measuring tube 4, together with the inlet and outlet tube pieces 103, 104, can be made from a single tubular stock of appropriate length.

For the case in which the measurement pickup is to be releasably assembled into the pipeline, the inlet tube piece 103 also has a first flange 2 formed on it, and the outlet tube piece 3 has a second flange 108 formed on it, with the flanges 2, 3 being also fixed to the support frame 6. Instead of by means of flanges 2, 3, the measurement pickup can also be connected to the mentioned pipeline in some other manner known to those skilled in the art, e.g. by means of triclamp connections or threaded connections; in case required, inlet tube piece 103 and outlet tube piece 104 can, however, also be connected directly with the pipeline e.g. by means of welding or brazing.

Besides the first measuring tube 4, the measurement pickup 1 in the example of an embodiment illustrated here further includes a second measuring tube 5, especially one identical and parallel to measuring tube 4. Measuring tube 5 likewise is flowed through by the medium to be measured and also is caused to vibrate during operation. To this end, the measurement pickup of the example of an embodiment includes inlet and outlet distributor pieces 105 and 106, into which, respectively, the inlet tube piece 103 and outlet tube piece 104 open, so that the measuring tube 4 in operation communicates with the connected pipeline via inlet and outlet tube pieces 103, 104, as well as inlet and outlet distributor pieces 105, 106. Analogously thereto, also measuring tube 5 is connected with the pipeline via the inlet and outlet distributor pieces 105, 106. In case required, possible mechanical stresses caused by the vibrating measuring tubes 101, 102 in the inlet tube piece 103 and the outlet tube piece 104 can be minimized e.g. by mechanically connecting the measuring tubes 101, 102 together, in manner common for such measurement pickups, by means, on the inlet end, of at least one, first node plate 109, and by means, on the outlet end, of at least one, second node plate 110. It is to be noted here, that, instead of measurement pickups with two measuring tubes flowed through during operation by the medium to be measured, it is also possible to use vibration-type measurement pickups using only a single measuring tube, such pickups being described, for instance, in U.S. Pat. No. 6,006,609, U.S. Pat. No. 5,549,009 or U.S. Pat. No. 6,666,098.

Finally, the measuring tubes 4, 5 are enclosed by a preferably metallic housing, which is composed of a support frame 6 and a housing cap 7. The housing serves, on the one hand, for protecting the internal components of the measurement pickup 1, such as the measuring tube 4, the exciter and sensor arrangements, etc., from external, environmental influences, such as e.g. dust or water spray. On the other hand, however, the housing also serves to retain escaping fluid as much as possible completely within the housing, up to a required maximum gage pressure, in the case of possible damage to the measuring tube 4, or measuring tube 5, if present, e.g. due to crack formation or bursting. Additionally, sound emissions resulting from the vibrations can be effectively suppressed by means of the housing. The material for the housing, especially also the housing cap 7, can be e.g. structural steel or even stainless steel.

Figure 2:
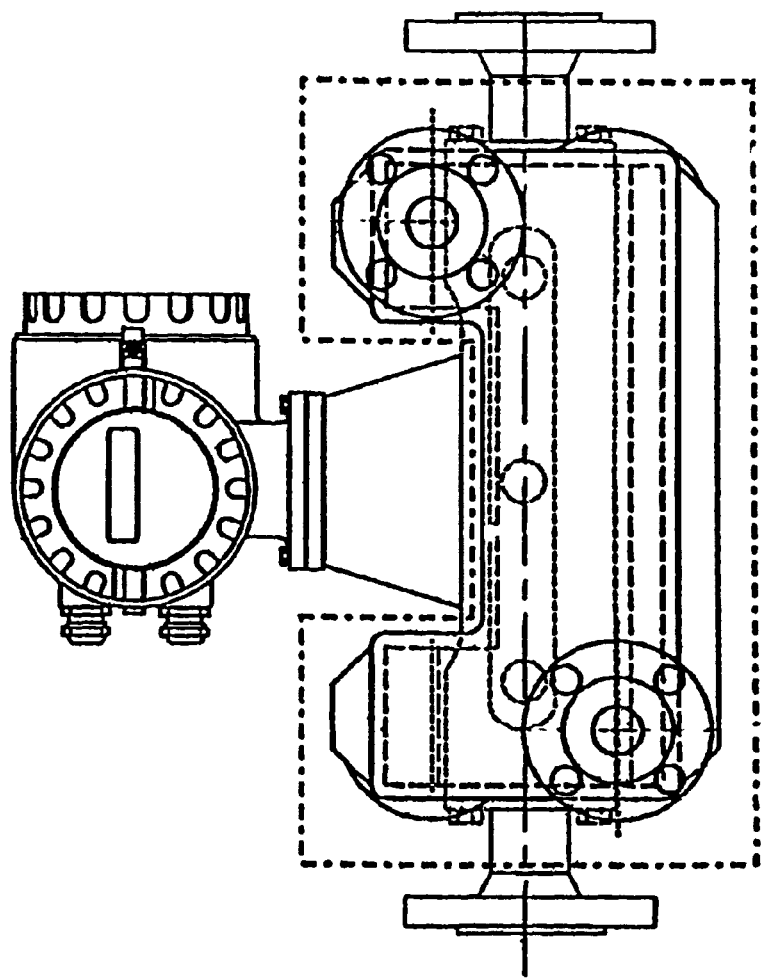
FIGS. 1, 2 show schematically an apparatus known from the state of the art for temperature control of an inline measuring device.
Figure 1:
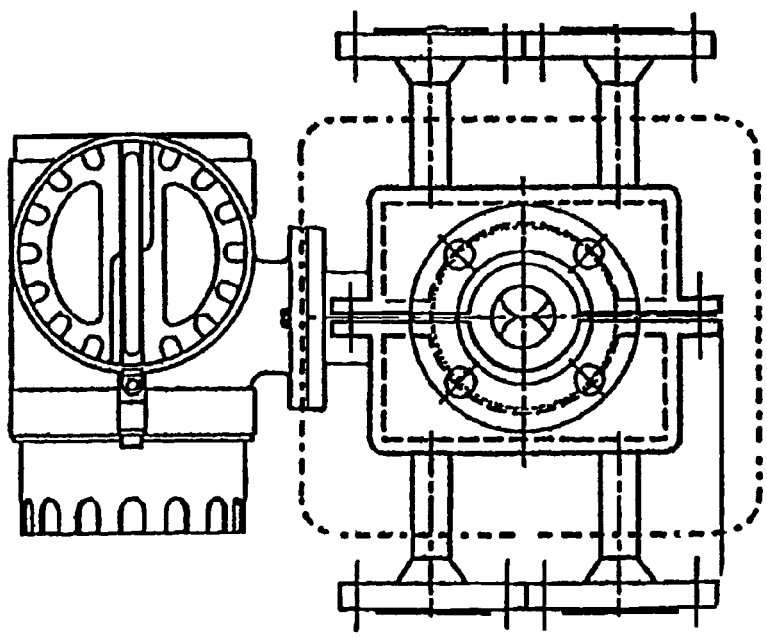
Figure 3:
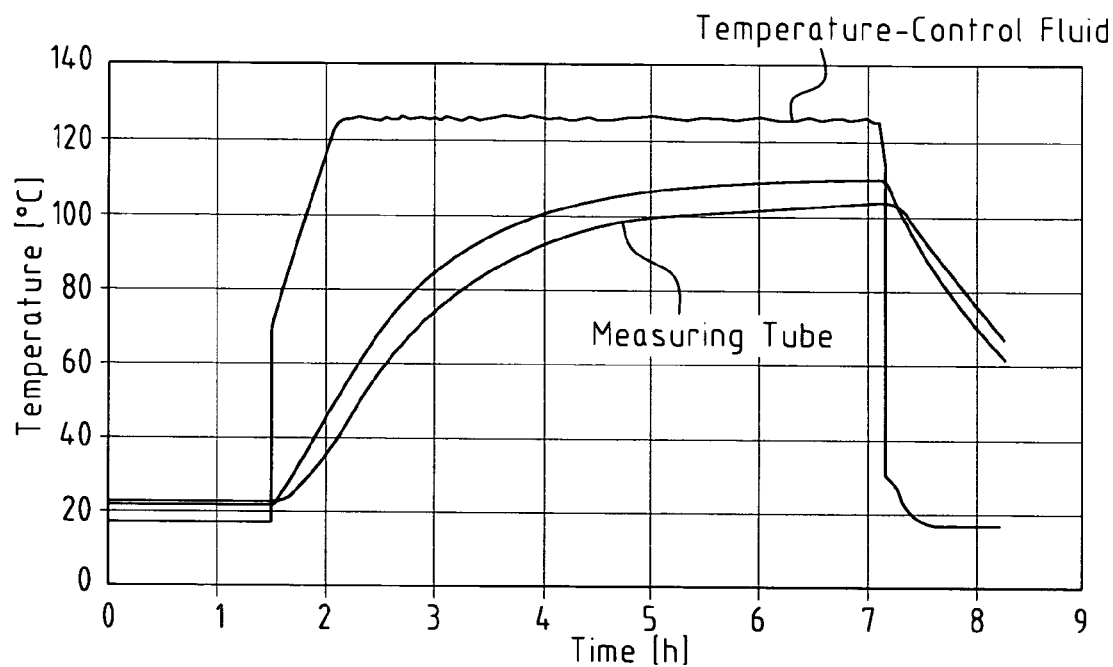
FIGS. 3, 4 show experimentally determined data for the apparatus of FIGS. 1, 2.
Figures 7, 8:
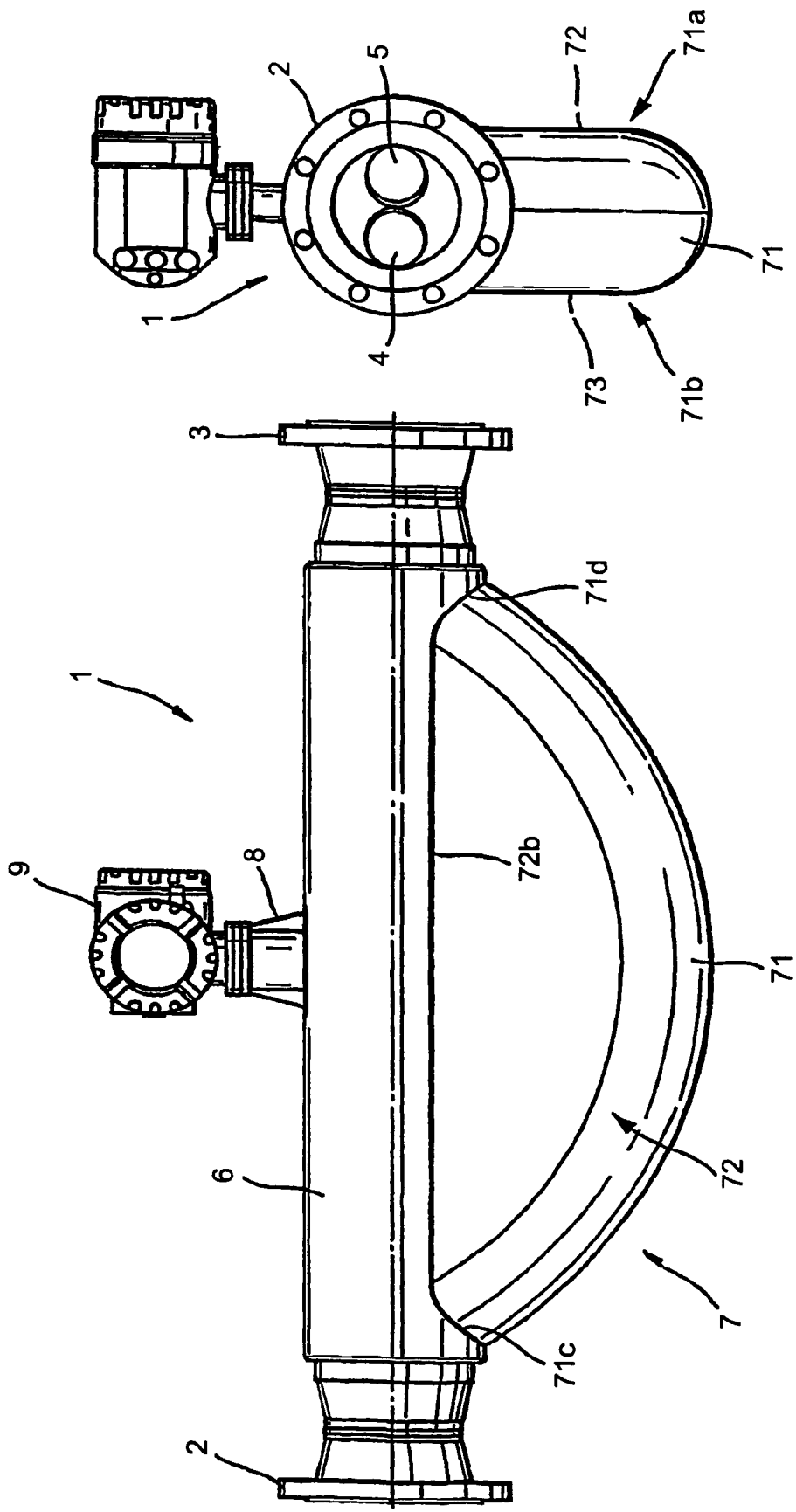
FIGS. 7-10 show details of an inline measuring apparatus suited for the apparatus of FIGS. 5, 6.

As shown in FIGS. 9 and 10, the measuring tubes 4, 5 are mounted in the, here, essentially tubular support frame 6 at the inlet and outlet ends in such a manner that they extend sideways out of the support frame 6, through two cutouts 61, 62, thus extending into the housing cap 7 fixed on the support frame 6. The housing cap 7, serving for the enclosure of the tube segments 41, includes, as schematically shown in FIGS. 7 and 8, a trough-shaped, first cap segment 71, as well as an essentially planar, second cap segment 72 and a third cap segment 73 essentially mirror-symmetric therewith. The shape of the cap segment 71 corresponds, as is evident, without more, from FIG. 3, essentially to that of a toroidal shell. In line with this, the cap segment 71 has an essentially circular-arc-shaped, preferably semicircular-shaped, cross section of a predeterminable first radius r, and, at least virtually, an essentially circular-arc-shaped, first segment edge 71a with a second radius R, which is significantly larger than the first radius r, as well as a second segment edge 71b of essentially identical shape as compared to the first segment edge. In case required, both the cross section and the segment edge do not need to be ideally circular. Thus, they can be given a slightly elliptical shape, at least in so far as an elasticity and/or ductility of the material of the housing cap is chosen such that the housing cap 7 reacts to an increasing internal pressure, in any case, with an adapting of the shape of the cap segment to that of an ideal toroidal shell.

FIGS. 7 and 8 also show an electronics housing 9 fixed on the support frame 6 by means of a necklike transition piece 8. Located in housing 9 is a measuring apparatus electronics of the inline measuring device; this produces, on the one hand, an exciter signal feeding the mentioned exciter arrangement, while, on the other hand, the measuring and operating circuit receives the signals of the mentioned sensor arrangement and generates therefrom desired signals representing the mass flow rate, density, viscosity or temperature of the flowing fluid. These desired signals can then be processed further or displayed. In FIG. 10, the transition piece 8 and the electronics housing 9 are omitted, so that a mounting surface, 63 for the transition piece 8 is visible. Arranged in the mounting surface 63 is an electric conduit 64, by means of which the electric connections can be made to the above-mentioned exciter arrangement and to the above-mentioned sensor arrangement, as well as to other possibly present, electric components, such as e.g. temperature sensors.

In the case of the measurement pickup shown here, the measuring tubes 4, 5 are excited by means of the oscillation exciter 113 to cantilever-type vibrations, in which the two measuring tubes 4, 5 oscillate in the manner of two tuning fork tines essentially in opposite phase to one another and so are each laterally deflected. The exciter arrangement 113 is, for this purpose, preferably fixed to a peak of each measuring tube 4, 5. For registering vibrations of the measuring tubes 4, 5, additionally, two oscillation sensors 114, 115, especially electrodynamic oscillation sensors, are provided, by means of which oscillation measurement signals S114, S115 suitably representing especially inlet and outlet vibrations of the measuring tubes 4, 5 are produced in manner usual for such measurement pickups. The oscillation measurement signals S114, S115 are, as schematically shown in FIG. 9, appropriately fed to the measuring apparatus electronics 20 for an electronic, further processing.

Figure 11:
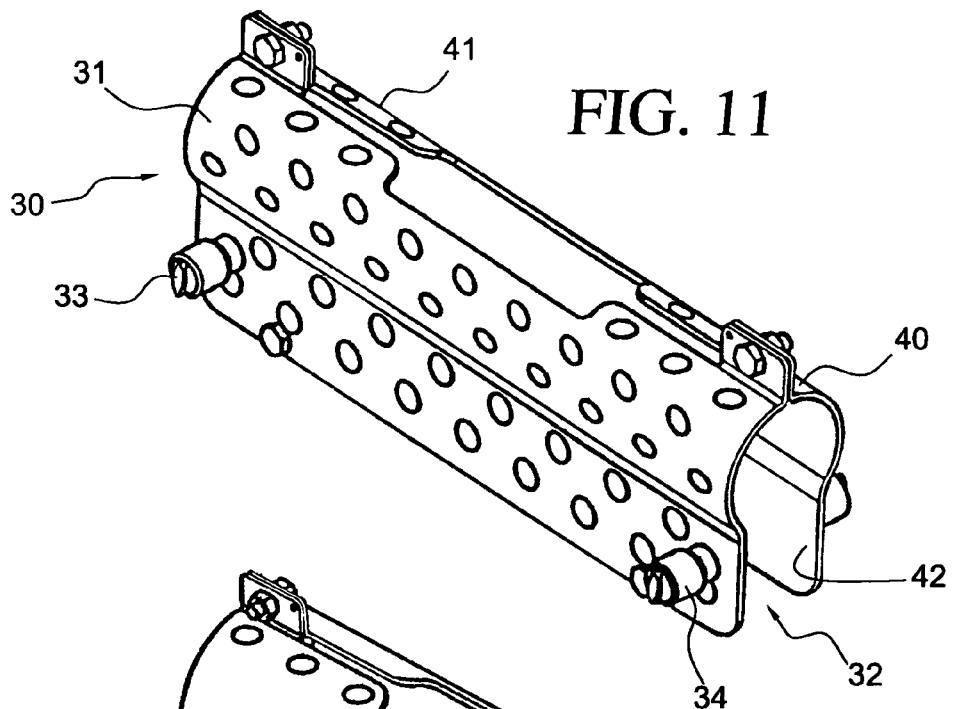
FIGS. 11-13 show details of various embodiments of heat exchangers of the invention.
Figure 12:
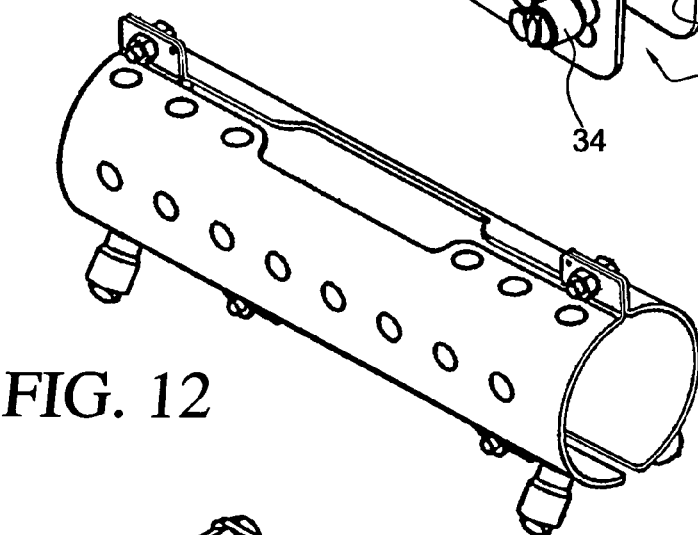
Figure 13:
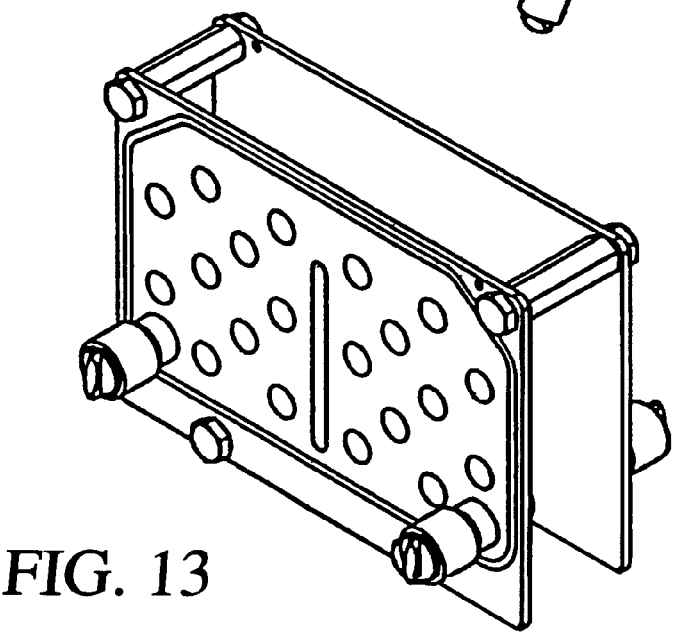

The apparatus of the invention for controlling temperature of the inline measuring device includes, fixed on the inline measuring device as shown in FIGS. 5 and 6, at least one, first heat exchanger 30, which, in operation, has, at least at times, a temperature-control fluid flowing through it for the purpose of transport of heat, as well as appropriate securement means 50, 60 for the preferably releasable fixing of the at least one, first heat exchanger 30 externally on the inline measuring device. Further examples of embodiments for the apparatus of the invention and for the heat exchanger 30 of the invention are shown schematically in FIGS. 11, 12 and 13.

The heat exchanger 30 includes at least two heat exchanger sheets, especially ones of stainless steel, or high-grade steel, of which one, inner, first heat exchanger sheet 32', especially one curved in trough- or shell-shape, is suited for at least sectionally flush contacting of the inline measuring device externally during operation, in a predeterminable contact region and, therefore, for forming an inner wall 32, especially one curved in trough- or shell-shape, of the heat exchanger, and of which an outer, second heat exchanger sheet 31' attached to the first heat exchanger sheet 32' forms an outer wall 31 of the heat exchanger; compare FIGS. 5, 6, 11 and 16. In the example of an embodiment shown in FIGS. 5, 6, the heat exchanger 30 is, as a consequence also of the measurement principle, so arranged on the inline measuring device that it at least partially flushly contacts the housing 6, 7. The heat exchanger can, however, also be placed directly against the measuring tube, especially in the case of an inline measuring device with a measuring tube which is at rest during operation and externally accessible. Such an inline measuring device with a measuring tube at rest can, for example, be an inline measuring device evaluating pressure fluctuations or pressure differences in the medium to be measured; see, for example that shown in U.S. Pat. No. 6,352,000.

The two heat exchanger sheets 31', 32' are connected together via an edge connection seam 90 extending along an edge region and sealed against escape of the temperature-control fluid, as well as via a multiplicity of internal connection locations 80, especially point, or ring, shaped ones, which are spaced from one another in an internal region enclosed at least in part by the edge connection seam 90, and, indeed, such that, between the inner wall and the outer wall, at least one chamber H is formed, having a multiplicity of chamber sections communicating with one another and serving for the conveying of the temperature-control fluid. The thus-formed chamber H is connected, via openings opening thereinto, into a temperature-control piping-system (not shown).

The outer, second heat exchanger sheet 31' has a multiplicity of regions 70, especially a multiplicity corresponding to the number of inner connection seams 80. In these regions 70, the material of the second heat exchanger sheet is plastically deformed, such that it is vaulted permanently outwards to form the chamber, or the mentioned chamber sections, located between the two heat exchanger sheets 31', 32'.

At least in the case of the inner connection seams 80, such are preferably high-strength laser welded seams scarcely susceptible to corrosion. In case required, however, also the edge connection seam 90 can be laser welded.

For connecting the heat exchanger 30 to the temperature-control piping system, there is attached on at least one of the two heat exchanger sheets, especially the outer sheet, an inlet nozzle 33 opening into the chamber H via a first opening 33A and permitting connection, especially releasable connection, of the heat exchanger 30 with a first fluid line (not shown) feeding the temperature-control fluid, and an outlet nozzle 34 opening into the chamber H via a second opening 34A and permitting connection, especially releasable connection, of the heat exchanger with a second fluid line (likewise not shown) carrying the temperature-control fluid away.

Figure 18:
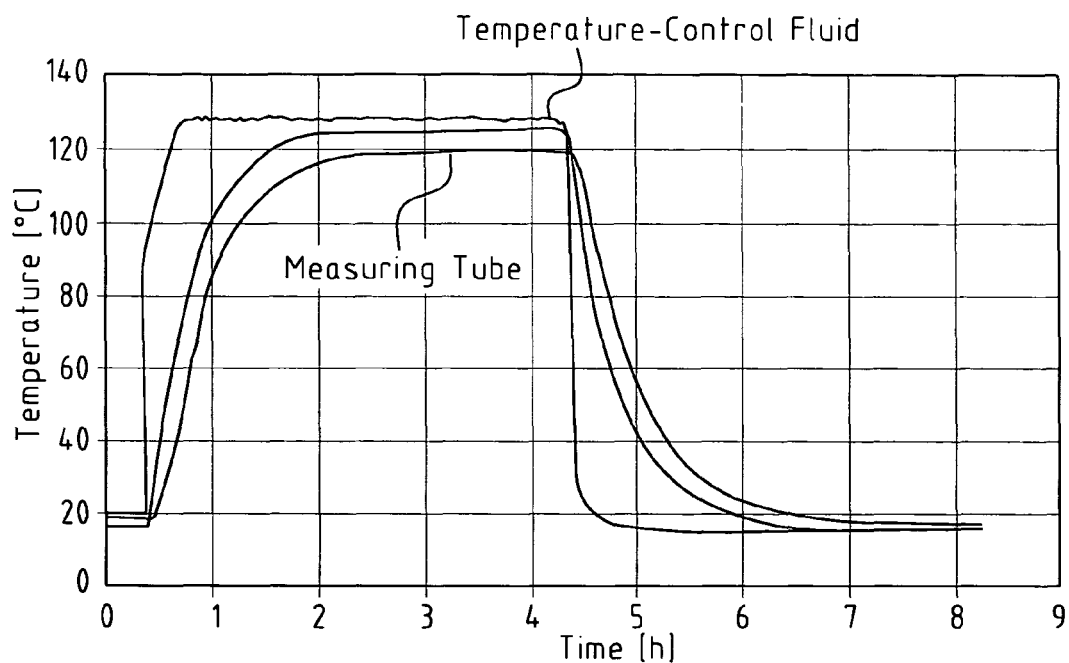
FIGS. 18-19 show experimentally determined measurement data for the apparatus of FIGS. 5, 6.

In a further development of the invention, the apparatus additionally includes a second heat exchanger 40, especially one of construction essentially equal to that of the first heat exchanger 30, with the securement means 50, 60 serving also for the fixing, especially the releasable fixing, of the second heat exchanger 40 externally to the inline measuring device; compare FIGS. 5 and 6. Measurements made with an apparatus constructed according to this further development of the invention showed a clear lessening of the thermal inertia, in comparison to the above-described, conventional devices; correspondingly experimentally determined measurement data for this variant of the invention are presented in FIG. 18 in a manner permitting comparison with the data of FIG. 3.

The two heat exchangers 30, 40 are, in an advantageous embodiment of this further development of the invention, secured by force fit on the inline measuring device, with the securement means 50, 60, in an advantageous embodiment of the invention, being embodied at least partially as integral components of the first and/or second heat exchanger. In the example of an embodiment shown here, the two heat exchangers 30, 40 are fixed to the inline measuring device essentially by being arranged opposite to one another on the inline measuring device and by being biased towards one another by suitable screwed connections, so that they are, in a way, "strapped" onto the inline measuring apparatus, in the manner of a clamp-on apparatus; compare FIG. 5, 6, 11, 12 or 13. For the case in which only the heat exchanger 30 is to be used alone, for example spring clamps mounted with appropriate screwed connections can serve as securement means 50, 60.

Figure 14:
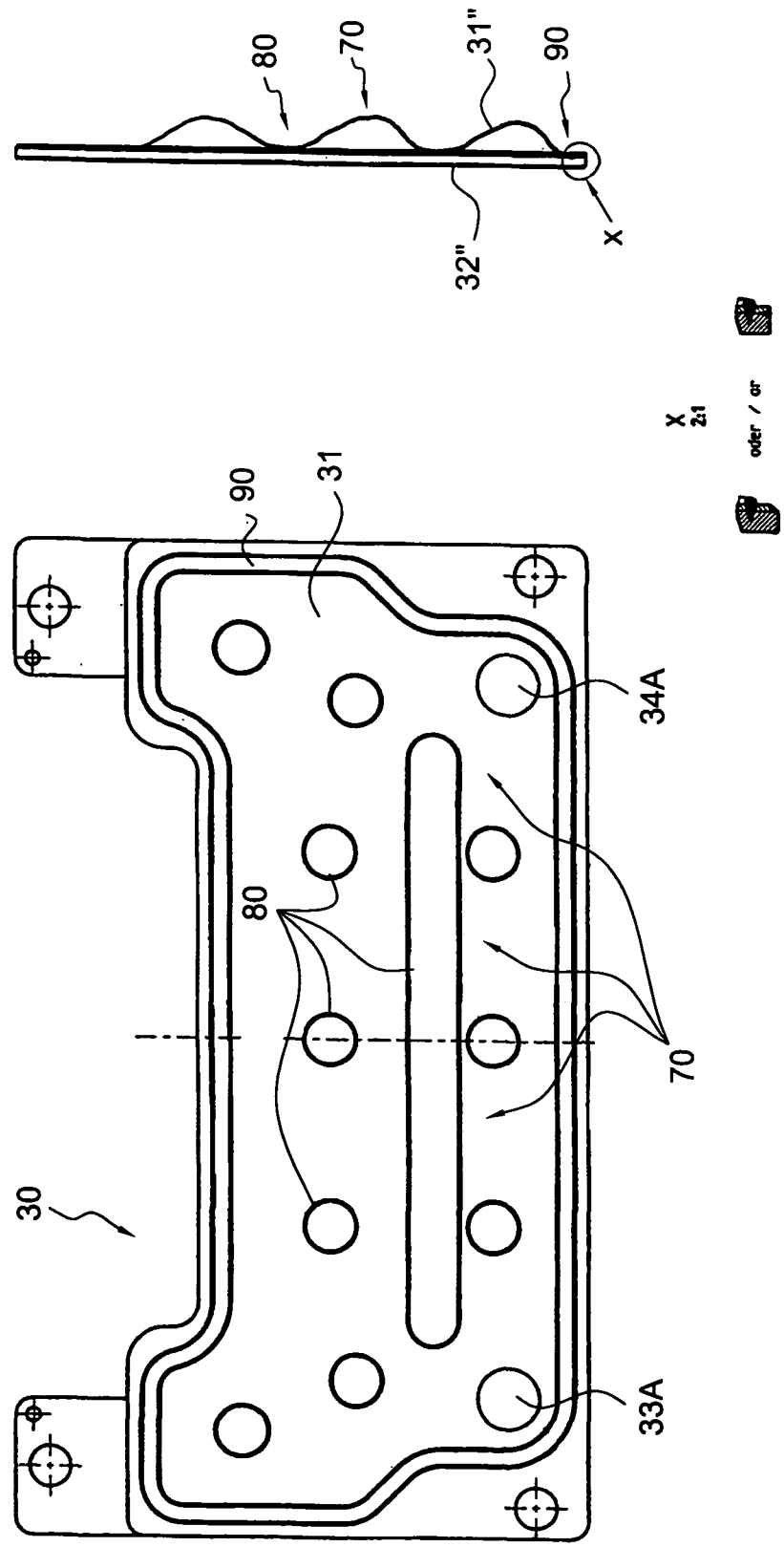
FIGS. 14-17 show components and details of heat exchangers suited for the apparatus of FIGS. 5, 6.
Figure 15:
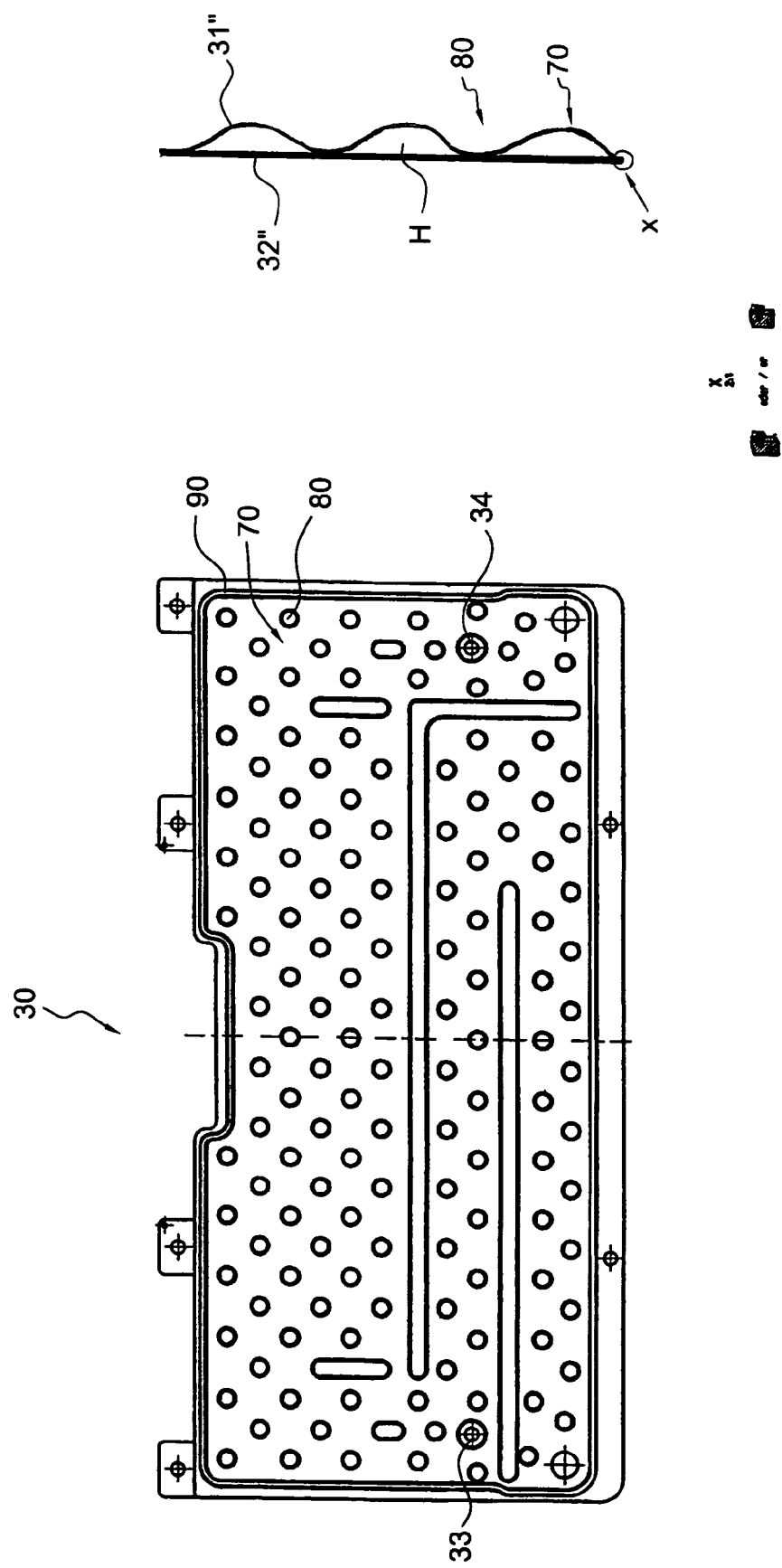

For manufacturing the heat exchanger 30, the openings 33A, 34A provided for the connecting of the heat exchanger to the temperature-control piping system are produced in a first sheet part 31" serving for the manufacture of one of the heat exchanger sheets. Then, the first sheet part 31" is laid on a second sheet part 32" serving for the manufacture of the other of the two heat exchanger sheets 31', 32', especially a sheet part having a sheet thickness different from a sheet thickness of the first sheet part 31". The edge connection seam 90, as well as the inner connection locations 80, are produced by appropriate welding, especially laser welding, of the two mutually superimposed sheet parts 31", 32"; compare, in this connection, also FIGS. 14 and 15. The welding can be done, for example, by means of a suitably programmed, automatic welder or welding robot.

Figure 16:
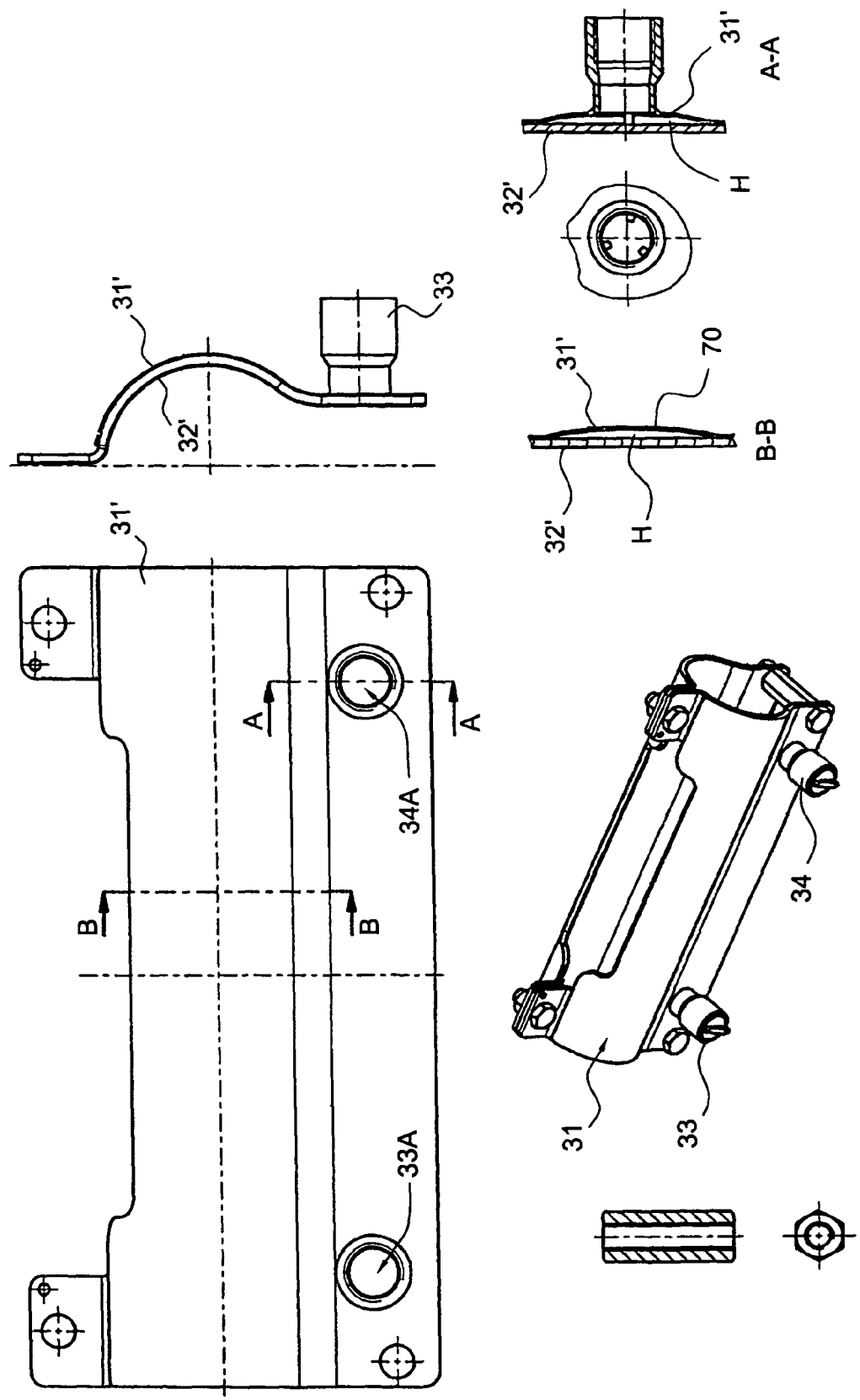
Figure 17:
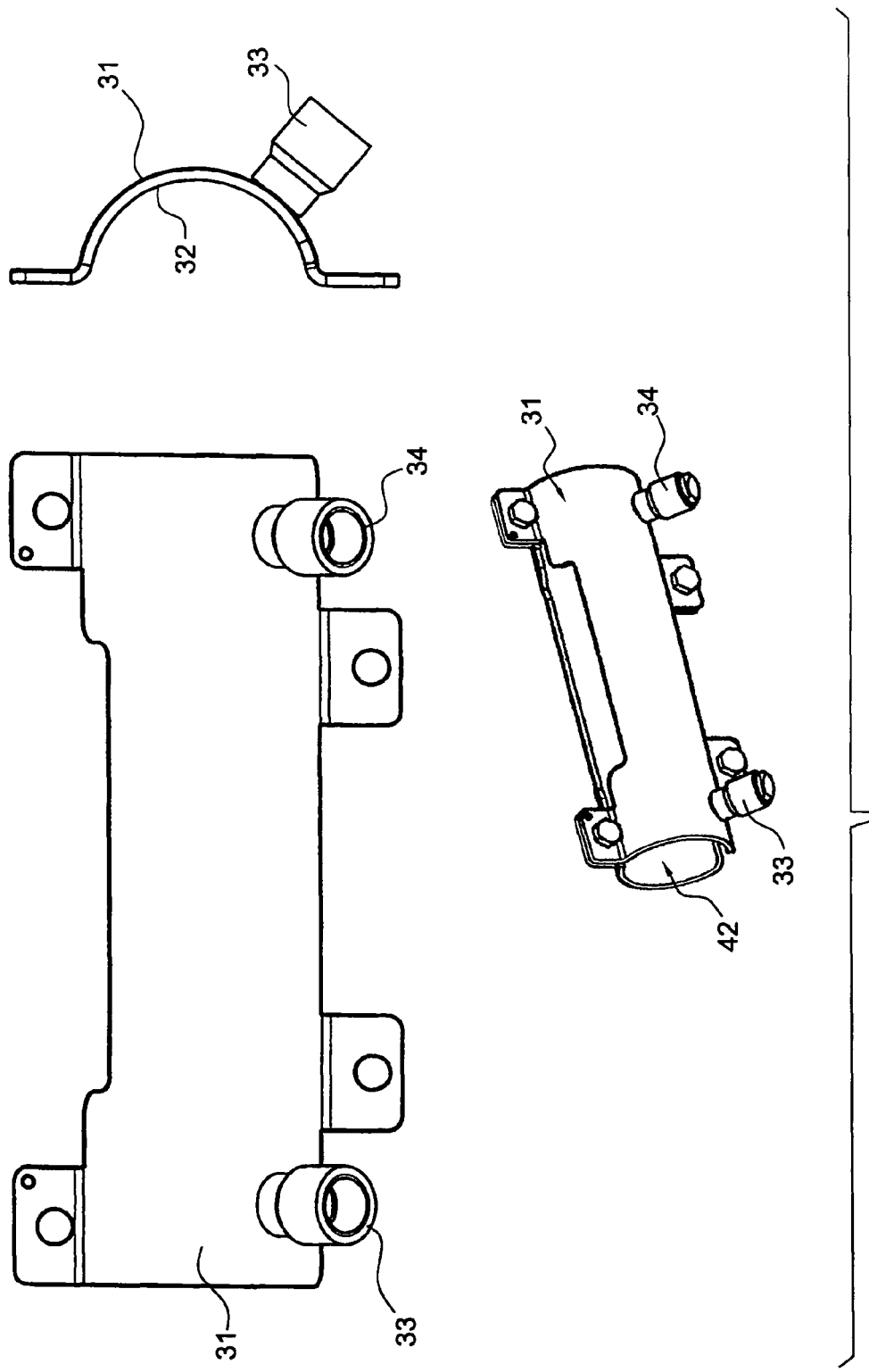

Now, the sheet parts 31", 32" can be matched to the outer contour of the inline measuring device, for example by bending or other suitable, especially cold forming, method; compare, in this connection, FIG. 16 or FIG. 17. Thus, the sheet parts are formed such that the sheet part 32" serving as inner heat exchanger sheet 32' has, at least sectionally, a spatial form corresponding to an external shape of the contact area provided on the inline measuring device. Thereafter, inlet nozzle 33 and outlet nozzle 34 can be mounted, for example by welding, in their belonging openings 33A, 34A in the sheet part 31" or 32".

For producing the desired shape for the chamber H, especially the above-mentioned regions 70 in the outer wall, largely incompressible fluid, especially water, oil or the like, is introduced through the first opening 33A by means of a pressure line connected to the inlet nozzle 33, into a chamber H' left between the two, mutually joined, sheet parts 31", 32". At the same time, air is taken out of the chamber via the second opening. Once the chamber H' is completely filled with the incompressible fluid, the outlet nozzle 34 is closed pressure-tight, and the fluid located in the chamber H' is loaded, for example by further feeding of fluid under high pressure, with a static pressure, which exceeds a static pressure of a surrounding atmosphere to a degree, especially by more than 100 bar, such that a widening of the chamber H' begins. By means of the fluid with the pressure superimposed thereon, the chamber H' is widened, such that a plastic deformation of the material of the sheet parts 31", 32" is achieved. The static pressure is maintained, and, if necessary, further increased, until the shape desired for the chamber H is reached.

Figure 4:
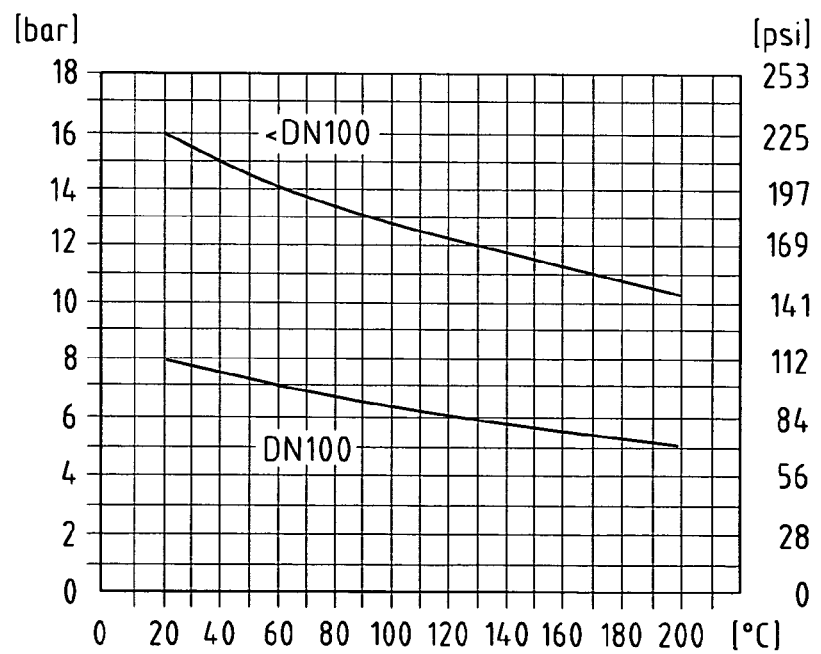
Figure 19:
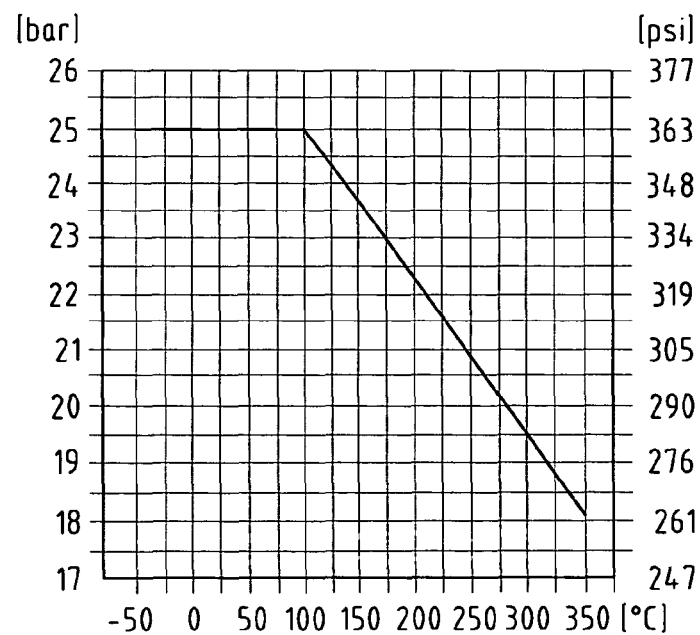

Through the application of the method of the invention, besides a significant simplification of the manufacture, it can be achieved that the heat exchangers 30, 40 produced in this way can satisfy highest requirements of pressure testing. Thus, by the loading of the fluid introduced into the chamber H', there occurs simultaneously to the deformation of the chamber H' always a concurrent pressure test of each individual heat exchanger, especially also each of the edge connecting seams 90, as well as also the inner connection locations 80. As a result of the high applied pressure—here at least 100 bar—such a piece testing of each individual heat exchanger can satisfy very high safety demands. A comparison of the measurement curves of FIG. 4 with the experimentally determined measurement data shown in FIG. 19 for a heat exchanger produced in the above-described manner shows, on the one hand, a marked increase of the pressure resistance. On the other hand, also a significant extension of the usable temperature range can be seen; for example, for the apparatus investigated, even in the case of a required factor of safety of four, pressure resistances of more than 4 bar can still be guaranteed at 300° C., this corresponding to a nominal pressure resistance of more than 16 bar.

The apparatus of the invention is, therefore, especially suited also for applications in the high temperature range, such as are described, for example, in the initially mentioned U.S. Pat. No. 4,876,898, WO-A 02 088 641 or also the present assignee's own, not-prepublished PCT/EP2004/002792.

Through the use of sheet parts 31", 32" of sheet thicknesses differing from one another for the manufacture of the heat exchanger sheets 31', 32', it is possible to assure, in very simple manner, that mainly only one of the two sheet parts 31", 32" is plastically deformed by the fluid deforming the chamber H', while the other is left almost in its initial form. In line with this, the sheet thickness of the inner heat exchanger sheet 32' is chosen greater than the sheet thickness of the outer heat exchanger sheet 31'.

Advantageously, before the fastening of the inlet nozzle 33 or the outlet nozzle 34 to the first sheet part 31", an edge of the relevant opening is bent upwards and/or crimped, so that, on the one hand, a good contact surface is produced for the welding of the nozzles to the sheet part 31", and, on the other hand, a fluid-tight sealing of the chamber H' in the region of the edge can be prevented with certainty; compare, in this connection, FIG. 16. Beyond these points, the bent-upwards edge can be fastened point-wise, especially tack-welded, to the opposite-lying section of the second sheet part 32", for stabilizing the edge.

The invention claimed is:

1. A method for a production of a heat exchanger for an inline measuring device including at least one measuring tube, which is insertable into a course of a process line serving to convey a process fluid to be measured, the heat exchanger includes:
   two heat exchanger sheets, of which an, inner, first heat exchanger sheet is suited for contacting the inline measuring device externally during operation at least sectionally flushly in a predeterminable contact area and, thus, to form an inner wall of the heat exchanger, and of which an outer, second heat exchanger sheet attached to the first heat exchanger sheet forms an outer wall of the heat exchanger, wherein:
   said two heat exchanger sheets are connected together via an edge connection seam running along an edge region, as well as via a plurality of inner connection locations arranged spaced from one another in an inner region at least partially surrounded by said edge connection seam, such that, enclosed by said at least two heat exchanger sheets, at least one chamber is formed exhibiting a plurality of sections communicating with one another, and
   said chamber is incorporatable, via first and second openings arranged in one of said at least two heat exchanger sheets and opening into such chamber, into a temperature-control piping system conveying a temperature-control fluid serving for the transport of heat, said method comprises the steps of:
   producing, said first opening provided for the connecting of the heat exchanger to the temperature control piping system in a first sheet part serving for the production of one of the heat exchanger sheets;
   laying the first sheet part on a second sheet part serving likewise for the production of one of the heat exchanger sheets;
   producing the edge connection seam and the inner connection locations by welding of the two superimposed sheet parts;
   introducing, through the first opening, fluid into a chamber remaining between the two sheet parts connected with one another;
   superimposing on the fluid filled in the chamber a static pressure, which exceeds a static pressure of a surrounding atmosphere to such a degree that an expansion of the chamber is initiated; and plastically deforming material principally of the thinner of the two sheet parts, by expanding the chamber by means of the fluid with the superimposed pressure.

2. The method as claimed in claim 1, further including the step of:

deforming, the sheet parts in such a manner that the sheet part serving at the inner, first heat exchanger sheet exhibits, at least sectionally, a spatial shape corresponding to an external shape of the contact region provided on the inline measuring device.

3. The method as claimed in claim 1, further including the steps of:

fixing a nozzle on the first sheet part, such that it opens into the first opening; and connecting a pressure line for the fluid onto the nozzle, as the case may be, fixed on the sheet part.

4. The method as claimed in claim 3, wherein:

the step of fixing the nozzle on the first sheet part includes a step of bending up and/or crimping an edge of the first opening.

5. The method as claimed in claim 4, wherein;

the step of fixing the nozzle on the first sheet part includes a step of at least pointwise fixing of the edge of the first opening on an oppositely lying section of the second sheet part.

6. The method as claimed in claim 1, further comprising the steps of:

producing in one of the two sheet parts said second opening provided for the connection of the heat exchanger to the temperature-control piping-system; and pressure-tight sealing of one of the first and second openings following the step of introducing fluid into the chamber.

7. The method as claimed in claim 6, further comprising the steps of:

fixing a nozzle on the first sheet part, such that it communicates through the first opening with the chamber; and pressure-tight sealing of the nozzle, as the case may be, fixed on the sheet part.

8. The method as claimed in claim 1, wherein the fluid, introduced through the first opening into said chamber remaining between the two sheet parts connected with one another is incompressible.

9. The method as claimed in claim 1, wherein the fluid, introduced through the first opening into said chamber remaining between the two sheet parts connected with one another is a fluid selected from a fluid group consisting of: water and oil.

10. The method as claimed in claim 1, wherein the second sheet part shows a sheet thickness different from a sheet thickness of the first sheet part.

11. The method as claimed in claim 1, wherein the first heat exchanger sheet is trough-shaped or dish-shaped.

12. The method as claimed in claim 1, wherein the static pressure, superimposed on the fluid filled in the chamber, exceeds the static pressure of said surrounding atmosphere by more than 100 bar.

13. The method as claimed in claim 1, wherein the step of deforming the sheet parts in such a manner that the sheet part serving at the inner, first heat exchanger sheet has, at least sectionally, a spatial shape corresponding to an external shape of the contact region provided on the inline measuring device includes a step of bending said sheet parts.

14. The method as claimed in claim 1, wherein the step of producing the edge connection seam and the inner connection locations by welding of the two superimposed sheet parts includes a step of laser welding.

* * * * *